US012671233B2

(12) United States Patent
Subkow et al.

(10) Patent No.: US 12,671,233 B2
(45) Date of Patent: Jun. 30, 2026

(54) SPARK PLUG WITH GROUND ELECTRODE IN A RECESS ON HOUSING END SIDE

(71) Applicant: Robert Bosch GmbH, Stuttgart (DE)

(72) Inventors: Sergej Subkow, Kornwestheim (DE); Ulrich Stockmeier, Bad Wildbad (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/716,179

(22) PCT Filed: Nov. 28, 2022

(86) PCT No.: PCT/EP2022/083390

§ 371 (c)(1),
(2) Date: Jun. 26, 2024

(87) PCT Pub. No.: WO2023/110374

PCT Pub. Date: Jun. 22, 2023

(65) Prior Publication Data

US 2025/0047077 A1 Feb. 6, 2025

(30) Foreign Application Priority Data

Dec. 17, 2021 (DE) ..................... 10 2021 214 624.4

(51) Int. Cl.
*H01T 13/16* (2006.01)
*H01T 13/32* (2006.01)

(52) U.S. Cl.
CPC ............ *H01T 13/32* (2013.01); *H01T 13/16* (2013.01)

(58) Field of Classification Search
CPC ................................ H01T 13/46; H01T 13/54
See application file for complete search history.

(56) References Cited

U.S. PATENT DOCUMENTS 10,714,908 B1 7/2020 Gozawa et al.
2006/0181185 A1 8/2006 Yamanaka et al.
2012/0125279 A1* 5/2012 Hampson ................ H01T 13/54 445/7
2012/0240890 A1* 9/2012 Johng ..................... H01T 13/54 123/169 P (Continued)

FOREIGN PATENT DOCUMENTS

DE 102017107728 A1 10/2018
WO WO-2019242930 A1 * 12/2019 ........... H01T 13/467

OTHER PUBLICATIONS

Machine translation of written opinion for PCT/EP2022/083390 (Year: 2023).*

(Continued)

*Primary Examiner* — Tracie Y Green
(74) *Attorney, Agent, or Firm* — NORTON ROSE FULBRIGHT US LLP

(57) ABSTRACT

A spark plug with a longitudinal axis. The spark plug includes a housing with a hole along the spark plug longitudinal axis and a combustion-chamber-side end side, wherein the housing has a recess on the end side thereof; an insulator arranged inside the housing; a central electrode arranged inside the insulator; and a ground electrode arranged in one of the recesses on the housing end side; wherein the ground electrode and the central electrode are arranged such that an ignition gap is formed within the housing.

9 Claims, 4 Drawing Sheets

(56) References Cited

U.S. PATENT DOCUMENTS

| | | | | |
|---|---|---|---|---|
| 2012/0299459 | A1 | 11/2012 | Sakakura et al. | |
| 2018/0294624 | A1* | 10/2018 | Niessner | H01T 21/02 |
| 2024/0413616 | A1* | 12/2024 | Schramm | H01T 13/32 |

OTHER PUBLICATIONS

International Search Report issued in PCT/EP2022/083390 on Feb. 17, 2023.

* cited by examiner

SPARK PLUG WITH GROUND ELECTRODE IN A RECESS ON HOUSING END SIDE

FIELD

The present invention relates to a spark plug. In particular, the spark plug according to the present invention is suitable for use in engines subject to high thermal loads, for example a hydrogen-powered engine.

BACKGROUND INFORMATION

Spark plugs are subject to specific thermal loads during engine operation. Traditionally, the ignition gap formed by the ground electrode and the central electrode is arranged outside the spark plug housing. There are many different ground electrode concepts for these spark plugs, with which, for example, the ground electrode is designed as a roof electrode or a longer side electrode. However, these spark plugs are subject to a high thermal load due to the necessary length of the ground electrode, which sets the limits for the use of such spark plugs in engines subject to high thermal loads.

SUMMARY

With the increasing planned use of hydrogen as a fuel in the combustion engine, it is necessary to design the spark plug to be more thermally resilient. Hydrogen-powered combustion engines are usually operated with a very lean air-fuel mixture (lambda>1.8) in order to fulfill the statutory emission requirements. In order to compensate for the low calorific value of hydrogen in the mixture, higher charge densities are achieved, resulting in higher pressures at the time of ignition. Another special feature of hydrogen combustion in an internal combustion engine is the interplay between auto-ignition temperature and the minimum ignition energy required. As a result, a "cold spark plug" is required for use in a hydrogen-powered combustion engine, i.e. a spark plug with a very low heat value or low component temperatures is required.

It is an object of the present invention to provide a spark plug that fulfills the requirements for a spark plug for use in engines subject to high thermal loads, for example a hydrogen-powered engine.

This object may be achieved with the spark plug according to the present invention. According to an example embodiment of the present invention, the housing comprises a recess on the end side thereof and the ground electrode is arranged in this recess, and in that the ground electrode and the central electrode are arranged such that an ignition gap is formed inside the housing.

The spark plug according to the present invention with a longitudinal axis comprises a housing with a hole along the spark plug longitudinal axis and a combustion-chamber-side end side, wherein the housing comprises a recess on an end side thereof, an insulator arranged inside the housing, a central electrode arranged inside the insulator, and a ground electrode arranged in the recess on the housing end side, wherein the ground electrode and the central electrode are arranged such that an ignition gap is formed inside the housing.

According to the present invention, the housing comprises a recess on the end side thereof and the ground electrode is arranged in this recess and the ground electrode and the central electrode are arranged such that an ignition gap is formed inside the housing. This has the advantage that the ground electrode and the ignition gap do not protrude into the combustion chamber. Furthermore, the ground electrode and the central electrode can be made shorter, as a result of which they protrude less far into the combustion chamber and, on the one hand, absorb less heat from the combustion chamber and, on the other hand, the shorter electrodes mean that the heat dissipation from the electrodes via the housing into a cylinder head, in which the spark plug according to the present invention is fitted, is more effective than in the case of a spark plug with longer electrodes. The arrangement of the ground electrode in the recess in the housing end side further improves heat dissipation from the ground electrode into the housing.

Further advantageous embodiments of the present invention are disclosed herein.

In an advantageous embodiment of the spark plug according to the present invention, the recess is a notch, in particular a rectangular notch. Notches can easily be formed in the combustion-chamber-side end side, for example by punching or milling.

In an alternative embodiment of the spark plug according to the present invention, the end side of the housing has a wave contour, wherein a wave trough is the recess in which the ground electrode is arranged. Due to the wave contour, there are no sharp edges at the transition from the combustion-chamber-side housing end side to the recess. These sharp edges could have an unfavorable effect on the flow of the fuel mixture.

In an advantageous further development of the embodiments of the spark plug according to the present invention, the recess has a depth T of T=0.1 mm or greater and/or T=15 mm or less. The depth T extends from a first plane, which is spanned by the combustion-chamber-side end of the combustion-chamber-side end side of the housing, to a second plane, which is spanned by the deepest point of the recess. The first plane and the second plane always extend perpendicularly to the spark plug longitudinal axis. The ground electrode is located at the lowest point of the recess, in the second plane. As a result, the ignition gap is arranged inside the housing. Due to this negative spark position, the possibility arises of designing the central electrode and the insulator shorter than usual, such that the central electrode and the insulator do not protrude as far into the combustion chamber and the path for heat dissipation is shorter and thus the heat dissipation is more effective.

In an advantageous further development of the spark plug according to the present invention, the combustion-chamber-side end side of the housing comprises two or more recesses, wherein the ground electrode is arranged in one recess.

For example, two recesses can be arranged opposite one another on the combustion-chamber-side end side of the housing. This is particularly advantageous if the ground electrode is formed as a roof electrode, which makes it possible to check the spacing between the electrodes and adjust it if necessary. In an alternative embodiment, two recesses are arranged at an angle, preferably at an angle of 80°-100°, in particular 90°, relative to one another on the combustion-chamber-side end side. This is particularly advantageous if the ground electrode is formed as a side electrode, as a result of which it is possible to check the spacing between the electrodes and adjust it if necessary.

For example, the spark plug can also comprise a plurality of ground electrodes, wherein each ground electrode is arranged in a recess. Advantageously, there is at least one more recess than ground electrodes, so that the advantages described above arise.

In a further development of the present invention, the ground electrode is formed once as a roof electrode and forms an axial ignition gap with the central electrode and another time as a side electrode and forms a radial ignition gap with the central electrode.

Advantageously, for example, the width of the ignition gap is not greater than 0.5 mm, in particular not greater than 0.15 mm. The smaller the ignition gap, the lower the voltage required to generate an ignition spark.

It is also advantageous that the width of the spark gap is at least 0.05 mm, in particular not less than 0.1 mm. As a result, the ignition gap is not too small. A very small ignition gap poses particular challenges for accuracy during spark plug production. A deviation from the most parallel possible alignment of the electrode ignition surfaces has a greater effect with a small ignition gap, such as uneven wear of the ignition surface, than with a larger ignition gap. Thus, the lower limit for the width of the ignition gap is a good compromise for a small ignition gap to reduce the ignition voltage requirement and wear on the one hand, and on the other hand a justifiable effort for a consistently good quality of the alignment of the ignition surfaces relative to one another during spark plug production.

The spark plug according to the present invention and its further development are a hydrogen spark plug, which is designed Substitute Specification to be used in a hydrogen-powered engine and to ignite the ignitable hydrogen-containing fuel-air mixture. The fuel can contain up to 100% hydrogen, i.e., the fuel can be hydrogen or a hydrogen-gas mixture.

However, the spark plug according to the present invention is not limited to operation with hydrogen. The spark plug according to the present invention can also be used for natural gas or gasoline internal combustion engines. However, the spark plug according to the present invention is optimized for operation with hydrogen.

DETAILED DESCRIPTION OF EXAMPLE EMBODIMENTS

Figure 1:
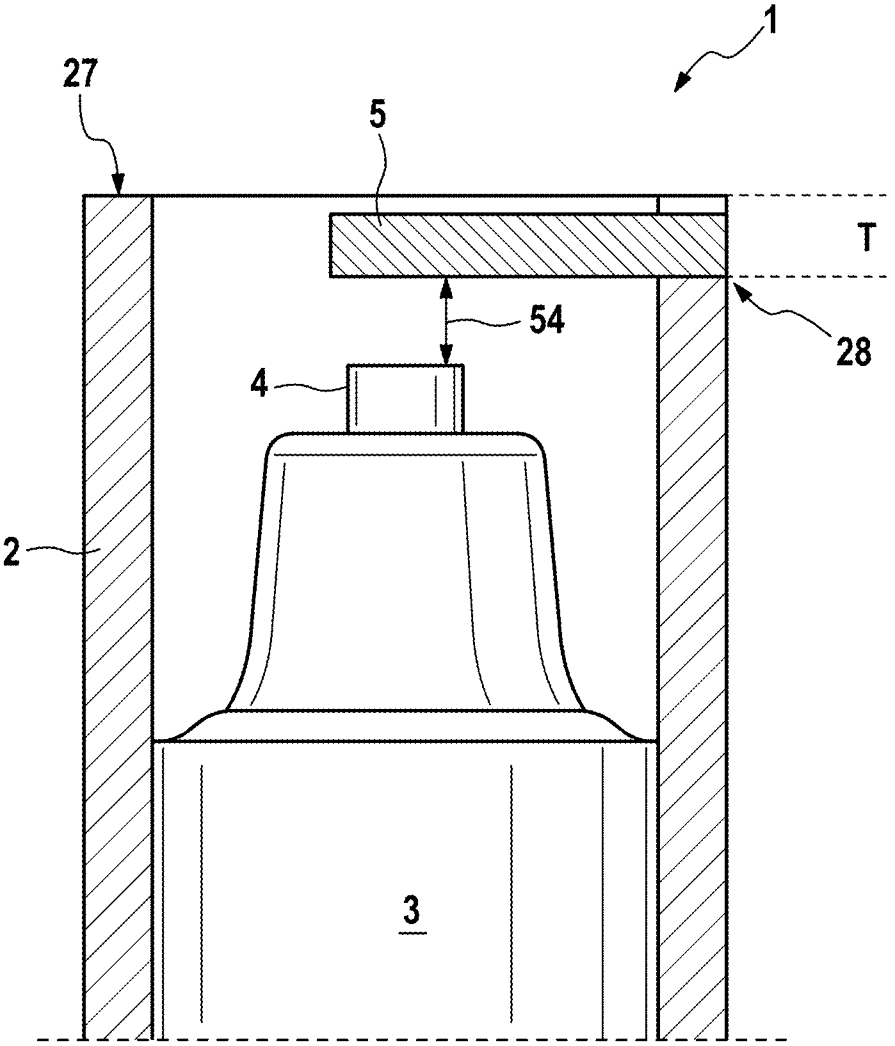
FIG. 1 shows the combustion-chamber-side end of the spark plug, according to an example embodiment of the present invention.

FIG. 1 schematically shows the combustion-chamber-side end of the spark plug 1 according to the present invention. The spark plug 1 comprises a housing 2, an insulator 3, a central electrode 4 arranged in the insulator 3, of which only the combustion-chamber-side end can be seen in FIG. 1, and a ground electrode 5. The ground electrode 5 is arranged in a recess 28 in the combustion-chamber-side end side 27 of the housing 2. In this example, the ground electrode 5 is formed as a roof electrode for the central electrode. This results in an axial ignition gap 54. Alternatively, the ground electrode 5 could also be formed as a side electrode for the central electrode 4, then resulting in a radial ignition gap 54.

The recess 28 extends from the combustion-chamber-side end side 27 of the housing 2 in the direction of housing end facing away from the combustion chamber. The recess has a depth T, which is measured in parallel with the longitudinal axis of the spark plug 1, starting from the combustion-chamber-side housing end side 27 to the deepest point of the recess 28. The ground electrode 5 is located at the lowest point of the recess 28. The depth T of the recess 28 also influences how far the ignition gap 54 is inside the housing 2.

For the sake of clarity, further components, such as the central electrode or insulator, are not shown in the other figures. Identical and functionally identical components have the same reference sign.

Figure 2:
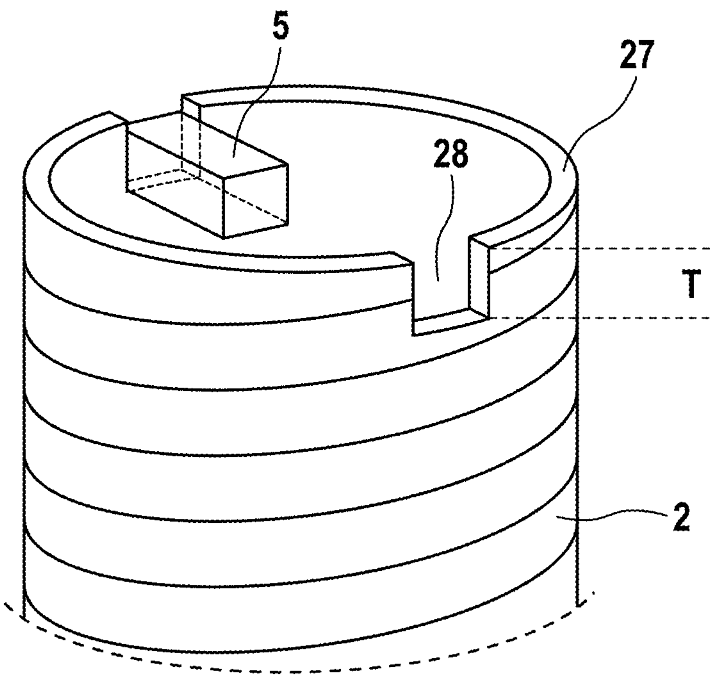
FIG. 2 shows the combustion-chamber-side end side of the housing with a first example of the first recess, according to an example embodiment of the present invention.

FIG. 2 schematically shows the housing 2 with two recesses 28 and a ground electrode 5 arranged in a recess 28. The recesses 28 are arranged opposite one another. As a result, it is possible, for example, to check and adjust the electrode distance, which forms the ignition gap 54. Preferably, the two recesses 28 have the same depth T.

Figure 3A:
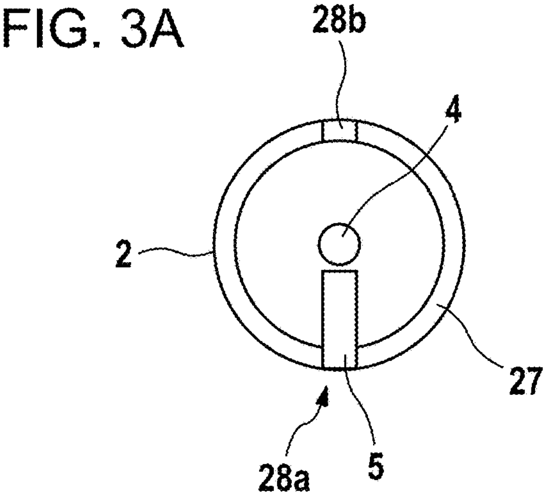
FIGS. 3A-3C show a top view of the combustion-chamber-side end side of the housing with at least two recesses, which are arranged differently in three examples, according to the present invention.
Figure 3B:
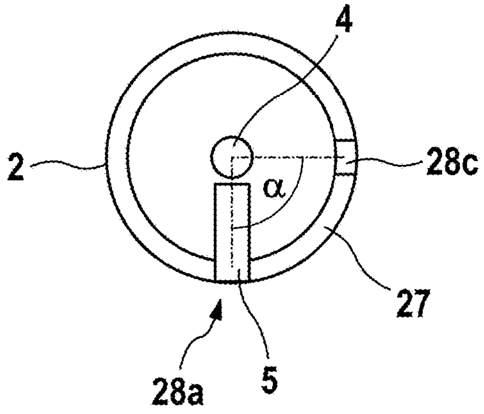
Figure 3C:
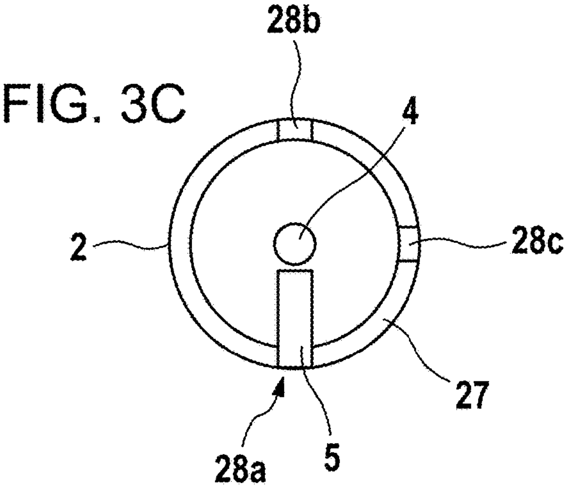

FIGS. 3A-3C show as a top view three examples of the arrangement and number of recesses 28 on the combustion-chamber-side end side 27 of the housing 2. The housing 2 with its combustion-chamber-side end side end side 27, two or three recesses 28, a ground electrode 5 and a central electrode 4 can be seen. The ground electrode 5 is shown in each case as a side electrode, but can also be formed as a roof electrode.

In FIG. 3A, the recesses 28*a*, 28*b* are arranged opposite one another as in FIG. 2. The angle between the recesses 28*a*, 28*b* is approximately 180°.

In FIG. 3B, two recesses 28*a*, 28*c* are formed on the combustion-chamber-side end side 27 of the housing 2. The recesses 28*a*, 28*c* are arranged at an angle relative to one another. The angle enclosed by the recesses 28*a*, 28*c* $\alpha$ is approximately 90°. The ground electrode 5 is arranged in a recess 28*a*.

Three recesses 28*a*, 28*b*, 28*c* are shown in FIG. 3C. Two recesses 28*a*, 28*b* are arranged opposite one another and one recess 28*c* is arranged at an angle to the other two recesses 28*a*, 28*b*. The ground electrode 5 is arranged in a recess 28*a*. The electrode spacing can be checked and adjusted from two perspectives.

For example, a second ground electrode can also be arranged in the recess 28*b* opposite the first ground electrode 5. Due to the angled recess 28*c*, the electrode spacing for both ground electrodes 5 can be checked and adjusted.

Figure 4:
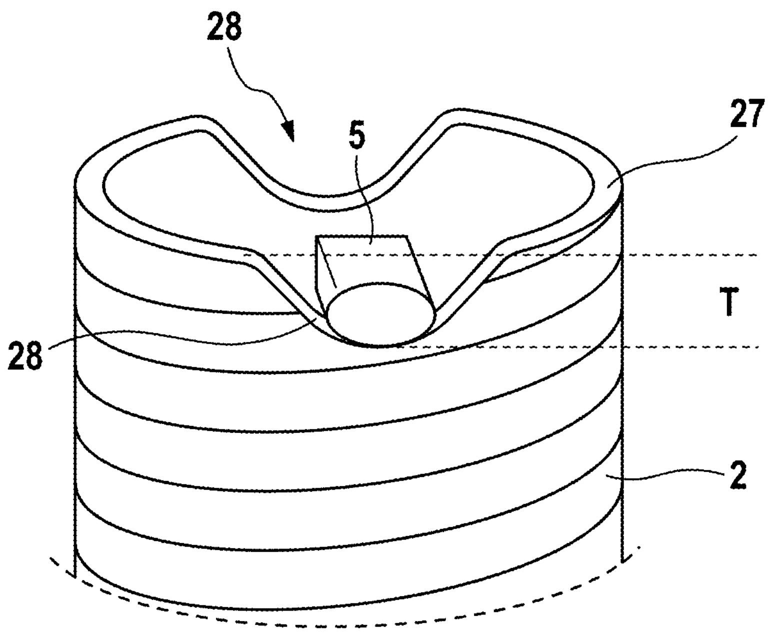
FIG. 4 shows the combustion-chamber-side end side of the housing with a wave contour and two recesses opposite one another as a further example embodiment of the present invention.

In FIG. 4, the combustion-chamber-side end side 27 can comprise a wave contour. In this example, the wave has two wave troughs that correspond to the recess 28. The ground electrode 5 is arranged in a wave trough. The opposite wave trough can be used to check and adjust the electrode spacing between the central electrode 4 and the ground electrode 5. The depth T of the recess 28 arises from the difference in height between the wave crest and the wave trough.

More than two recesses 28 can be produced accordingly, in that the wave contour has more than two, for example four wave troughs. The number of possible wave troughs depends proportionally on the diameter of the housing 2. The larger the diameter, the more wave troughs and recesses 28 can be formed on the combustion-chamber-side end side 27 of the housing 2.

In all examples, the ground electrode 5 is pressed or welded into the recess 28.

The invention claimed is:

1. A spark plug with a longitudinal axis, comprising:

a housing with a hole along the spark plug longitudinal axis and a combustion-chamber-side end side, wherein the housing has a recess on the combustion-chamber-side end side of the housing;

an insulator arranged inside the housing;

a central electrode arranged inside the insulator; and a ground electrode arranged in the recess on the combustion-chamber-side end side of the housing;

wherein the ground electrode and the central electrode are arranged such that an ignition gap is formed within the housing, wherein the recess extends from the combustion-chamber-side end side of the housing towards the housing end facing away from the combustion chamber, wherein the ground electrode is located at the lowest point of the recess, wherein the recess has a depth such that the ignition gap is arranged entirely within the housing, and wherein neither the central electrode nor the ground electrode protrudes into the combustion chamber.

2. The spark plug according to claim 1, wherein the recess is a rectangular notch.

3. The spark plug according to claim 2, wherein the combustion-chamber-side end side of the housing has a wave contour, a wave trough being the recess in which the ground electrode is arranged.

4. The spark plug according to claim 2, wherein the recess has a depth T, wherein Tis 0.1 mm≤T≤15 mm.

5. The spark plug according to claim 1, wherein the combustion-chamber-side end side of the housing includes two or more recesses, the ground electrode being arranged in one on the recesses.

6. The spark plug according to claim 5, wherein two of the recesses are arranged opposite one another or at an angle of 100°-80° relative to one another.

7. The spark plug according to claim 1, wherein: (i) the ground electrode is formed as a roof electrode and forms an axial ignition gap with the central electrode, or (ii) the ground electrode is formed as a side electrode and forms a radial ignition gap with the central electrode.

8. The spark plug according to claim 1, wherein the ignition gap is not greater than 0.5 mm.

9. The spark plug according to claim 1, wherein the spark plug is a hydrogen spark plug which is configured to be used in an engine operated with hydrogen and to ignite an ignitable hydrogen-containing fuel-air mixture.

* * * * *